(12) United States Patent
Larsen et al.

(10) Patent No.: US 12,722,462 B2
(45) Date of Patent: Sep. 1, 2026

(54) SEALING LIP HAVING IMPROVED LOAD LOSS AND COMPRESSION SET PROPERTIES

(71) Applicant: Cooper-Standard Automotive Inc., Northville, MI (US)

(72) Inventors: Douglas C. Larsen, Highland, MI (US); Kastriot Shaska, Northville, MI (US); Peter Koetsier, Westland, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 636 days.

(21) Appl. No.: 18/110,001

(22) Filed: Feb. 15, 2023

(65) Prior Publication Data

US 2023/0302885 A1 Sep. 28, 2023

Related U.S. Application Data

(60) Provisional application No. 63/311,063, filed on Feb. 17, 2022.

(51) Int. Cl.
*B60J 10/16* (2016.01)
*B60J 10/74* (2016.01)
*B60J 10/80* (2016.01)

(52) U.S. Cl.
CPC ............... *B60J 10/16* (2016.02); *B60J 10/74* (2016.02); *B60J 10/80* (2016.02)

(58) Field of Classification Search
CPC .... B60R 13/06; F16J 15/3284; F16J 15/3204; B60J 10/16; B60J 10/74; B60J 10/80
USPC ........................................... 428/122; 296/93
See application file for complete search history.

(56) References Cited

U.S. PATENT DOCUMENTS

2006/0082189 A1* 4/2006 Sultan .................... B60J 10/248 296/146.9
2019/0084209 A1* 3/2019 Hiroe ...................... B29C 48/21

* cited by examiner

*Primary Examiner* — Catherine A. Simone
(74) *Attorney, Agent, or Firm* — Lippes Mathias LLP

(57) ABSTRACT

A sealing lip assembly exhibits improved load loss and compression set properties. In a first embodiment, a seal lip has a first end connected to a base and a second end extending outwardly from the base. A hinge is provided in the seal lip between the first and second ends to allow the second end to angularly rotate relative to the base wherein the base and seal lip are made from a single elastomeric material. In a second embodiment, a seal lip has a first end connected to a base and a second end extending outwardly from the base. A hinge is provided between the first and second ends to allow the second end to angularly rotate relative to the base. The base and seal lip are made from different hardness elastomeric materials. The seal lip has a first durometer portion over substantially an entire length between the hinge and the second end, and a second durometer portion from the first end to a knit line formed where the first and second durometer portions abut one another.

13 Claims, 18 Drawing Sheets

Tensile Strain vs Load Reduction - EPDM 70 ShA (DMA)

Load Loss (%): 0, 5, 10, 15, 20, 25, 30, 35, 40, 45, 50

Tensile Strain (%): 0, 5, 10, 15, 20, 25, 30, 35

FIG. 6B

| North American Test Method- cooled uncompressed (TPV elastomer) | | | |
|---|---|---|---|
| Description | Graphic | Load Loss (LL) | Compression Set (CS) |
| High Strain- single durometer | | 30-35% | 40-45% |
| High Strain- dual durometer | | 30-35% | 30-35% |
| Low Strain- single durometer | | 60-75% | 60-75% |

FIG. 12A

| European Test Method- cooled compressed (TPV elastomer) | | | |
|---|---|---|---|
| Description | Graphic | Load Loss (LL) | Compression Set (CS) |
| High Strain- single durometer | | 45-55% | 50-60% |
| High Strain- dual durometer | | 45-55% | 50-60% |
| Low Strain- single surometer | | 75+% | 75+% |

FIG. 12B

| **Lip Design Material Useage Comparison** | | | |
|---|---|---|---|
| Description | Geometry | Cross sectional area | Savings |
| Single durometer lip design | | $129mm^2$ | |
| Dual durometer lip design | | $116\ mm^2$ | Material savings = $19mm^2$ Approx. 10% |

FIG. 12C

SEALING LIP HAVING IMPROVED LOAD LOSS AND COMPRESSION SET PROPERTIES

This application claims the priority benefit of U.S. provisional application Ser. No. 63/311,063, filed Feb. 17, 2022, the entire disclosure of which is incorporated herein by reference.

BACKGROUND

This invention relates to a weatherstrip or weatherseal, and more particularly to a sealing lip therefor used to seal against a window surface such as a movable window of a vehicle. The present disclosure may also find application in other vehicle seal applications, and particularly other automotive seal applications.

Current automobile manufacturers specify a compression load deflection (CLD) range for each type of seal the manufacturer purchases for its vehicles, where CLD is a measure of the resistance of a sealing lip to being deflected. This CLD range is currently specified on a green or undeflected sealing lip before it has set. For most thermoplastic lip seals, the sealing force after setting can be quite small compared to its initial force.

As an example, a sealing lip made from typical thermoplastic elastomeric compound might start out with a CLD of 10N/100 mm length and drop to only 2.5-4.0N/100 mm after setting. This is quite a significant drop in force over approximately 24 hours. If this example was a belt seal (waist seal), it is quite likely that the door window (sometimes referred to as door glass) will cycle very slowly with a 10N/100 mm seal force while after setting a 2.5N/100 mm seal force would be considered the minimum required force for sealing out water, wind, and wiping dew from the window.

A secondary benefit to automobile manufacturers is that reducing the difference between green sealing force and set sealing force may allow manufacturers to reduce the size of door regulator motors and likewise possibly reduce the gauge of the wires to these motors. Both of these may save weight.

Automotive seal designers are faced with designing sealing lips that will have sufficient force for good sealing against intrusion by water and air and with low enough forces that they will allow free movement of door windows and/or door closing efforts.

Making this task more difficult is that sealing lips of all elastomers will exhibit a loss of seal force over time (load loss or LL where the load loss is a measurement of the load reduced over time while being compressed) and a change of free position (compression set or CS), i.e., how the lip fails to return to its initial position after being deflected with a force over time. This is measured in a straight-line distance instead of an angular rotation.

While thermoset elastomers like EPDM have decent properties of LL and CS, these materials are more costly, require energy to cure them, and are not easily recyclable like thermoplastic elastomers. The downside of thermoplastic elastomers is that they have much larger values (worse) of load loss and compression set.

There is an interesting relationship between strain (can be either tensile or compressive, where strain is the change in length over a given length) in an elastomer (a natural or synthetic polymer with viscoelasticity and weak intermolecular forces, generally low Young's modulus and high strain failure compared to other materials) and the properties of compression set and load loss. This relationship is pretty simple in that both CS and LL are minimized when the strain of an elastomer reaches a certain target value. ($\varepsilon T$). For TPV, this target value is approximately $\varepsilon T$=15% strain. For EPDM, this target value is $\varepsilon T$=15%-25% strain.

There is likely more than one reason why this occurs but at least one reason and perhaps the simplest reason is that under tensile strain polymer chains of an elastomer are stretched and less twisted and entangled compared to polymer chains in the relaxed state. This helps the polymer chains overcome the friction of twisting and sliding past one another. Reducing this friction produces a more spring behavior that more closely follows Hooke's law, i.e., spring movement over a distance (x) is linearly proportional to the force (F) applied to the spring ($F=-kx$), and reducing this friction improves the properties of CS and LL.

A need exists for an improved system that overcomes one or more of the above-noted problems and/or provides at least one or more of the above-described features in a simple, manufacturable manner, as well as still other features and benefits.

SUMMARY

With this new understanding of strain and hinge design this same lip with an initial (green) CLD of about 10N/100 mm would only drop to a set CLD ranging from 5.0-7.0N/100 mm. This is a very acceptable sealing force for sealing out water, wind and will also wipe dew from the window while cycling.

Having a much higher load after setting will allow a seal manufacturer to specify a lower initial (green) CLD which achieves the same load after setting. For example, instead of specifying a green CLD of 10N/100 mm as was previously done, specifications can now establish a reduced, green CLD of 3N/100 mm-6N/100 mm and still achieve an acceptable minimum load after setting. The secondary benefit to an automobile manufacturer is that reducing the difference between green sealing force and set sealing force may allow the manufacturer to reduce the size of door regulator motors and possibly reduce the gauge of the wires to these motors. Both of these may save weight.

This disclosure details arrangements/designs and methods to significantly reduce the difference in sealing force between uninstalled fresh seals (green seals) and installed seals (set seals) after setting. Setting under load occurs fairly quickly for most thermoplastic seals and is roughly complete about 24 hours after installation depending mostly on temperature.

Still other benefits and advantages of the present disclosure will become more apparent from reading and understanding the following detailed description.

BRIEF DESCRIPTION OF THE DRAWINGS

FIGS. 6A and 6B are graphical representations of data using a dynamic mechanical analyzer showing percentage tensile strain along the x-axis and percentage load loss along the y-axis.

FIGS. 12A, 12B, and 12C are tables representing representative load loss percentage ($(F_0-F_1)/F_0$) and compression set percentage ($(P_0-P_1)/P_0$) according to two commercially accepted test methods.

DETAILED DESCRIPTION

Figure 1:
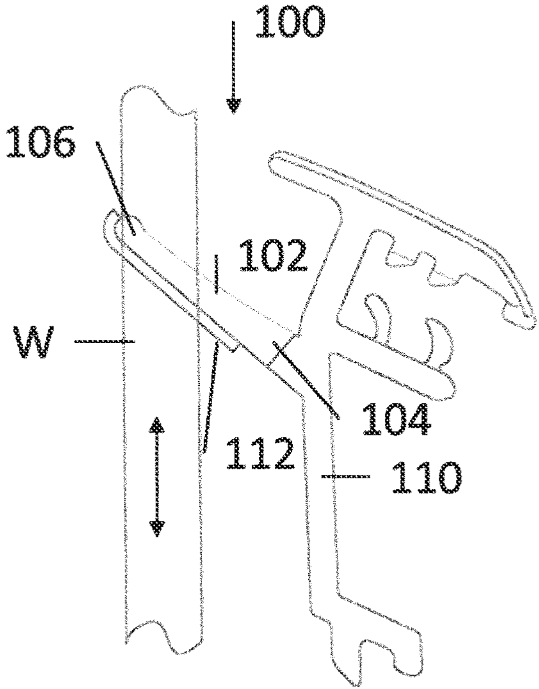
FIG. 1 is a schematic representation of a sealing lip that employs a tapered design.

The following description with reference to the accompanying drawings is provided to assist in a comprehensive understanding of one or more embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. Various exemplary embodiments of the present disclosure are not limited to the specific details of different embodiments and should be construed as including all changes and/or equivalents or substitutes included in the ideas and technological scope of the appended claims. In describing the drawings, where possible similar reference numerals are used for similar elements.

The terms "include" or "may include" used in the present disclosure indicate the presence of disclosed corresponding functions, operations, elements, and the like, and do not limit additional one or more functions, operations, elements, and the like. In addition, it should be understood that the terms "include", "including", "have" or "having" used in the present disclosure are to indicate the presence of components, features, numbers, steps, operations, elements, parts, or a combination thereof described in the specification, and do not preclude the presence or addition of one or more other features, numbers, steps, operations, elements, parts, or a combination thereof.

The terms "or" or "at least one of A or/and B" used in the present disclosure include any and all combinations of words enumerated with them. For example, "A or B" or "at least one of A or/and B" mean including A, including B, or including both A and B.

Although the terms such as "first" and "second" used in the present disclosure may modify various elements of the different exemplary embodiments, these terms do not limit the corresponding elements. For example, these terms do not limit an order and/or importance of the corresponding elements, nor do these terms preclude additional elements (e.g., second, third, etc.) The terms may be used to distinguish one element from another element. For example, a first mechanical device and a second mechanical device all indicate mechanical devices and may indicate different types of mechanical devices or the same type of mechanical device. For example, a first element may be named a second element without departing from the scope of the various exemplary embodiments of the present disclosure, and similarly, a second element may be named a first element.

It will be understood that, when an element is mentioned as being "connected" or "coupled" to another element, the element may be directly connected or coupled to another element, and there may be an intervening element between the element and another element. To the contrary, it will be understood that, when an element is mentioned as being "directly connected" or "directly coupled" to another element, there is no intervening element between the element and another element.

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

An automotive sealing lip is akin to a beam connected to a fixed body at its base which typically undergoes a small deflection of approximately 2-5 mm. With such a small deflection it is not easy to get strain values high enough to significantly improve its properties of load loss and compression set. To address this situation, three embodiments of the present disclosure were developed.

In FIG. 1, there is shown a conventional seal lip assembly 100 that has at least one elongated seal lip 102 wherein the seal lip has a first, proximal end portion or end 104 and a second, distal end portion or end 106. The seal lip is preferably connected in cantilevered fashion to a mounting body 110. Typically, the seal lip 102 has a cross-sectional configuration conducive to being extruded for ease of manufacture. The first end portion 104 of the seal lip 102 is joined to the mounting body 110 and the second end portion 106 extends outwardly from the mounting body in an undeflected state at a desired angle relative to the mounting body to advantageously position the seal lip relative to a surface to be sealed, e.g., window or glass W. A seal surface such as a flock or thin coating 112 is provided on the lip 102 and extends over a major portion of at least one surface of the lip that faces the window W. Although in the figures of the present disclosure, the seal lip 102 appears to extend into the window W, these illustrations are conventional in the industry to represent that the seal lip has an undeflected position that would extend beyond the surface of the window (if the window was not present) so that the flock/coating 112 of the seal lip engages a surface of the window with a desired sealing force (i.e., the seal lip is deflected by the window and the restoring force of the seal lip provides the sealing force against the window surface that the seal lip abuts). Oftentimes, the window W translates (i.e., is selectively raised or lowered) relative to the seal lip 102, and the seal surface 112 of the seal lip slides in sealing relation along one surface of the window W to limit wind, rain, dew, etc. from entering an automotive interior. As is also evident in FIG. 1, it is also preferred that the flock/coating 112 of the seal lip 102 extends over a terminal end of the seal lip and along a major portion of an elongated surface of the seal lip so that ideally only the flock/hard coating 112 will engage the window surface.

In FIG. 1, the seal lip 102 preferably has a tapering thickness over its longitudinal length, i.e., preferably tapering from its widest or thickest cross-section at the first end portion 104 adjacent the mounting body 110 and decreasing in thickness as the seal lip proceeds toward the terminal, second end portion 106. In FIG. 1, the taper is continuous over the longitudinal length. The tapering thickness results in the strain being substantially evenly distributed throughout the longitudinal length of the seal lip 102. Such a design would only achieve a maximum strain value of less than 5% (<5%). Historically, the development of such tapered lip designs came from came about for two reasons: (1) the false belief that lowering strain concentrations would improve the properties of LL and CS, which is incorrect, and (2) EPDM is easier to extrude into shapes that have varying wall thicknesses than thermoplastic elastomers, which were not in large scale use for sealing automotive vehicles before approximately mid-1990.

The material of the seal lip 102 is preferably an elastomer (e.g., the elastomeric material of the seal lip may be Ethylene Propylene Diene Monomer (EPDM), Thermoplastic Vulcanizate (TPV), Thermoplastic Elastomer (TPE), Thermoplastic Rubber (TPR), Thermal Plastic Styrene (TPS), silane-crosslinked polyolefin elastomer, or Styrene-Ethylene-Butylene-Styrene (SEBS)). Two common elastomers are thermoset elastomers like EPDM or a thermoplastic elastomer such as a thermoplastic vulcanizate (TPV). Sealing lips formed of elastomers will exhibit a loss of seal force over time (load loss or LL). Moreover, elastomers will exhibit a change of free position (compression set or CS). Generally speaking, thermoset elastomers like EPDM have desirable properties of load loss and compression set; however, thermoset elastomers are generally more costly, require energy to cure them, and are not as easily recyclable when compared with thermoplastic elastomers. On the other hand, thermoplastic elastomers have significantly larger values (worse values) of load loss and compression set. Consequently, understanding these various drawbacks of both thermoset elastomers and thermoplastic elastomers still allows the design of FIG. 1 to be manufactured from either elastomeric material.

Figure 2:
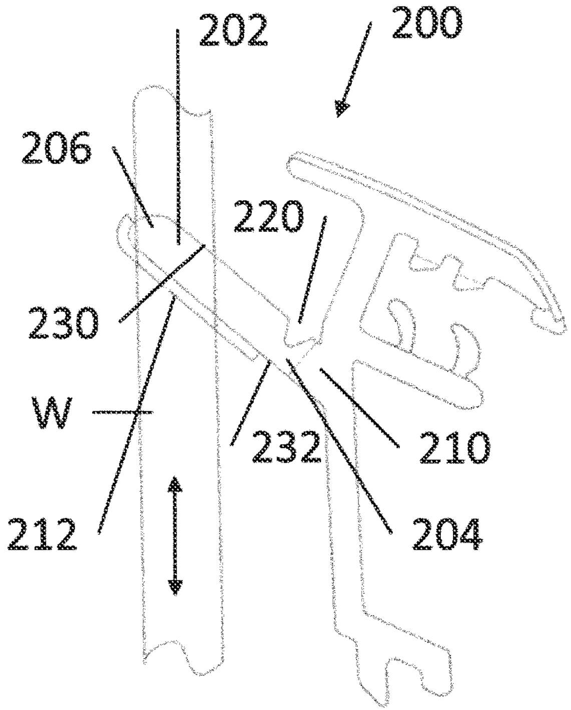
FIG. 2 schematically illustrates a single durometer lip that has a substantially constant thickness over a majority portion of the lip that concentrates bending in a hinge region of the lip.
Figure 3:
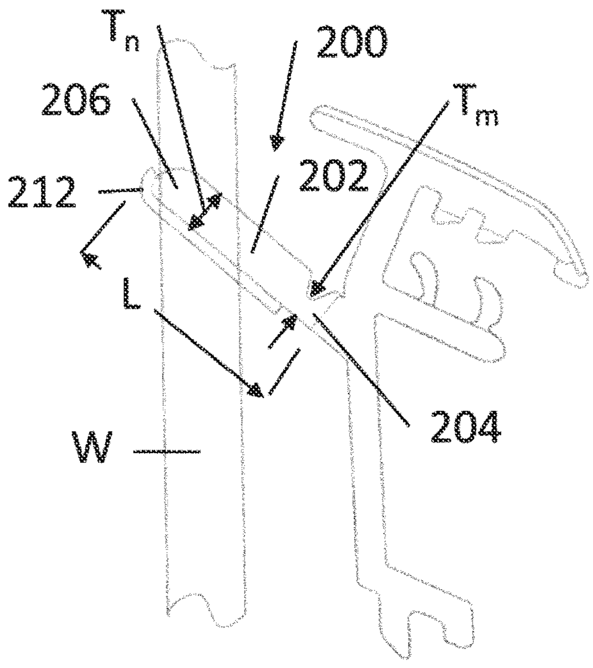
FIGS. 3 and 4 show a belt seal assembly employing a single durometer lip that is related to the embodiment shown in FIG. 2.
Figure 4:
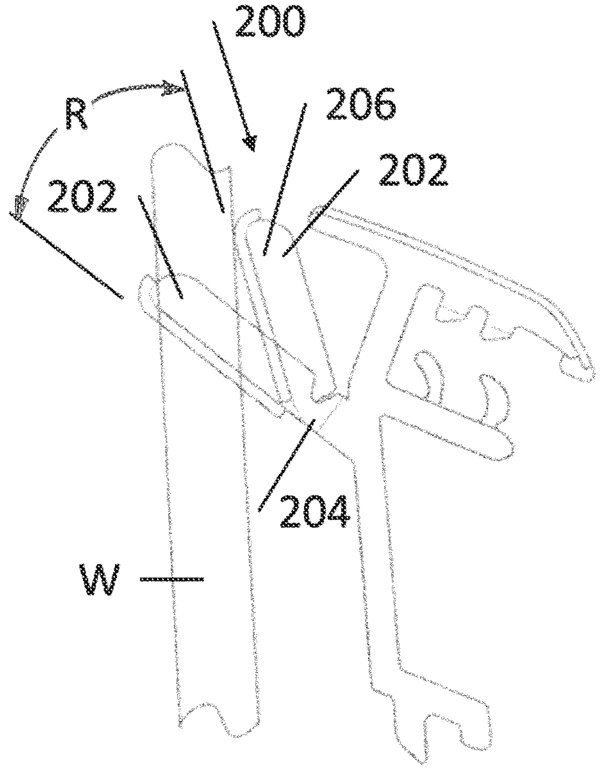

A first preferred embodiment of a seal lip assembly 200 according to the present disclosure is shown in FIG. 2 (and also embodied in the seal assembly shown in FIGS. 3 and 4). The first embodiment of the seal lip assembly 200 is generally described or referred to as a single durometer seal lip 202 in which a majority of the lip is thick enough that the seal lip does not bend. As a result, an intent of this first embodiment is to concentrate all or a substantial portion of the strain at a desired region of the seal lip 202, and is shown in FIG. 2 as a seal lip having a substantially constant cross-sectional thickness over its length extending from a first or proximal end portion or end 204 and a second or distal end portion or end 206. In similar fashion, the first end portion 204 of the seal lip 202 is preferably integrally joined (e.g., coextruded) with mounting member 210. The embodiment of FIG. 2 achieves this goal of concentrating the strain by providing a specially designed hinge 220. Flock 212 (similar to flock 112/312) is provided on the lip 202.

In this preferred embodiment, the seal lip 202 is preferably a single durometer material having at least one or more of the following features. The seal lip 202 ideally has a ratio of lip length L (FIG. 3) to nominal thickness $T_n$ that ranges from 5:1 to 8:1. A generally V-shaped groove that forms the hinge 220 extends into the cross-sectional thickness of the seal lip 202 from a non-seal surface 230 toward the seal surface 232. The hinge is preferably located in the first end portion 204 of the seal lip 202 adjacent where the seal lip joins or merges into the mounting body 210. Diverging walls that form the V-shaped groove form an included angle that ranges from 25°-40°. Further, a ratio of the lip nominal thickness $T_n$ to a lip thickness minimum $T_m$ preferably ranges from 1.9:1 to 3.2:1. Still further, a lip rotation angle R (FIG. 4) preferably ranges from 25° to 35°. In a preferred range, the single durometer lip may have a Shore A hardness that ranges from 60 to 80 Shore A, such as when the seal assembly 200 is used as a belt seal for sealing a window in an automotive vehicle door.

Figure 5:
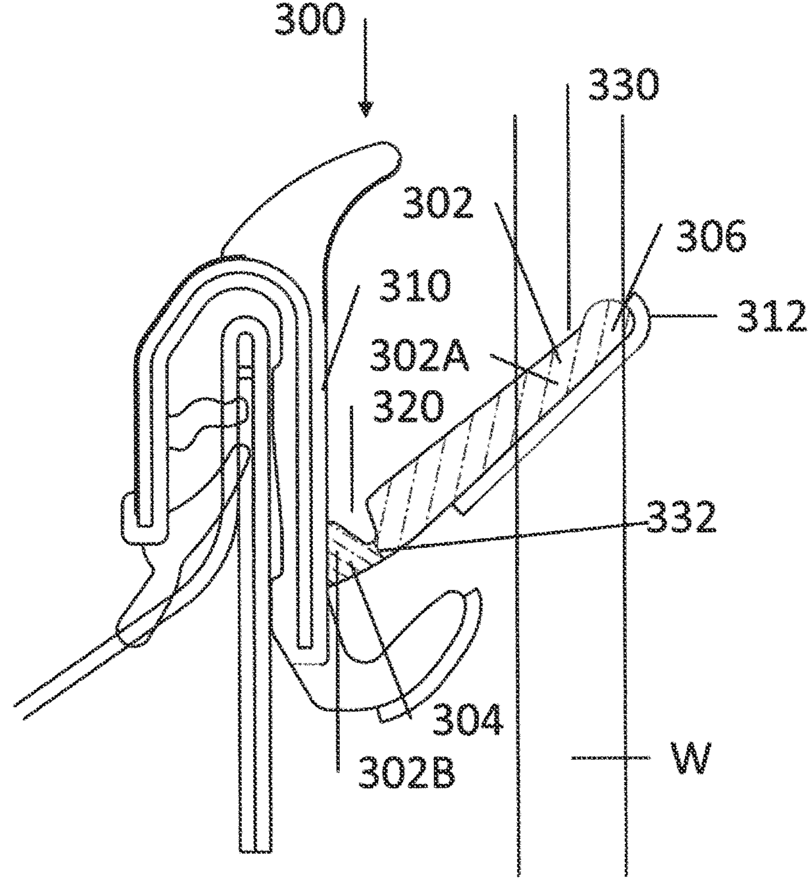
FIG. 5 shows a multi-durometer lip with a majority of the lip being a harder material and less likely to bend while a hinge region is a softer material for concentrating bending in that region.
Figure 6A:
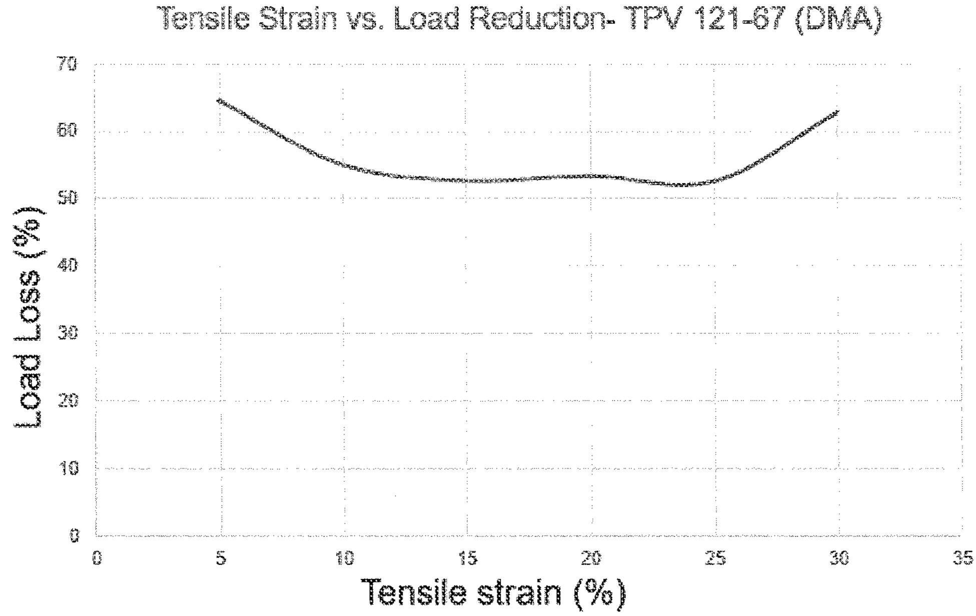
Figure 6B:
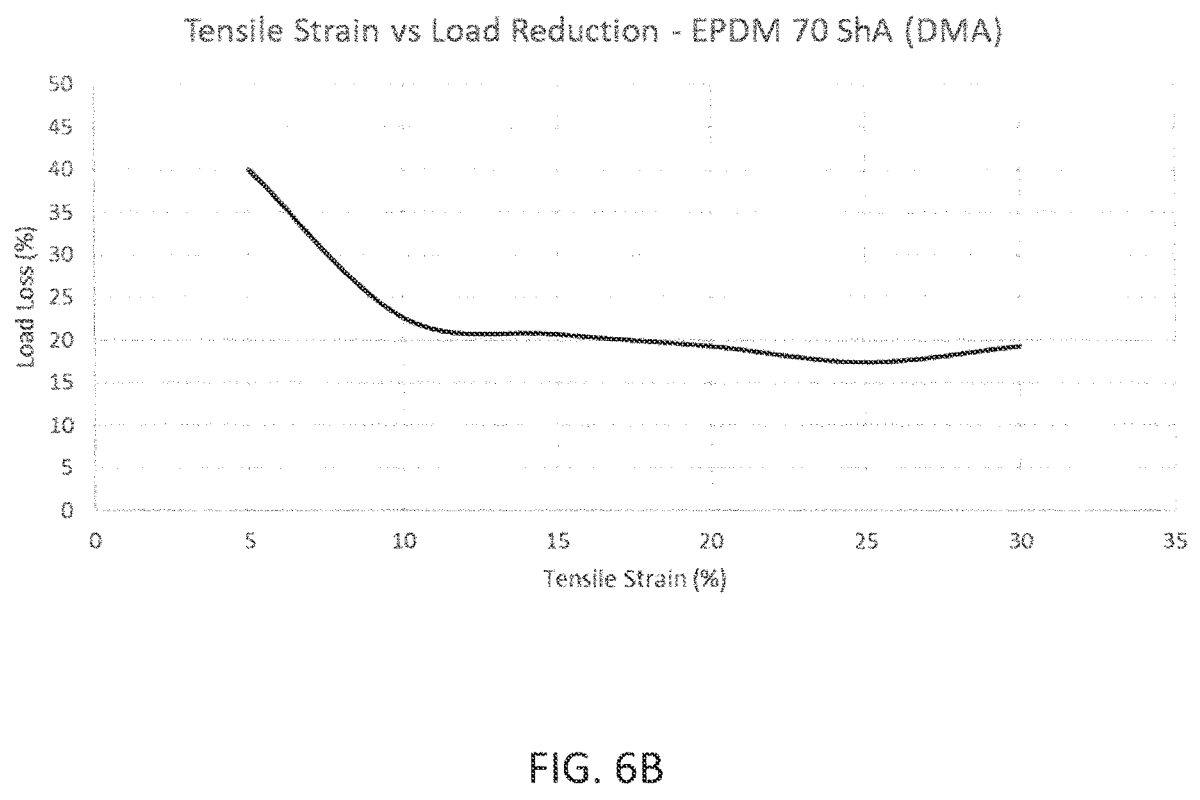

In a second preferred embodiment (FIG. 5), a seal lip assembly 300 includes a seal lip 302 having portions thereof made from different materials. Particularly, the seal portions can be the same material having different durometers, or different materials that have different durometers, i.e., a seal lip with more than one durometer. The seal lip 302 has a first or majority portion 302A formed from a first or harder material (higher durometer or higher modulus) that is less likely to bend under load. Additionally, the first or majority portion of 302A can also be a polymeric material like polypropylene which is more appropriately described in terms of modulus. Modulus can be defined as the ratio of applied stress (along an axis) and the deformation or strain of a test specimen. A second or minor portion 302B is formed from a second or softer material (lower durometer), and the second portion 302B may have a slightly increased thickness relative to the first portion 302A in some versions thereof (compare FIG. 5 with FIGS. 2-4). As shown, first end portion or end 304 forms a part of the overall longitudinal extent of the seal lip 302, and is spaced from a second end portion or end 306. The first end portion 304 interfaces or extends from the mounting portion 310 of the seal assembly 300, and is configured to position the seal lip 302 in a non-perpendicular orientation or angle relative to the surface of the window W. The angular orientation of the seal lip assures that flock or coating 312 provided on one face of the seal lip will engage and slide along window W as it is selectively raised or lowered. Hinge 320 is preferably located in the lower durometer or softer material portion 302B of the seal lip 302. As a result, virtually all of the strain of the seal lip is concentrated in the hinge 320. Illustrative data comparing tensile strain (%) compared to load loss or load reduction over time is graphically represented in FIG. 6. A peak target strain $\varepsilon_T$ of 15%-25% is desired, although 15%-20% is still ideal for a thermoplastic vulcanizate where the target peak strain value in the hinge may vary from one material to another; however, a similar curve is preferably used to design sealing lips and hinges formed from different elastomeric materials. The graphical representation also shows load loss of the sample in tension only, and when applied to a sealing lip in bending where bending has both tensile and compressive strains, still further improvements over prior arrangements are achieved. For example, FIGS. 6A and 6B show approximately 20% improvement of load loss when the strain increases from 5% to 15%, although substantial testing has showed that significantly greater than 20% improvement can be achieved using the teachings of the embodiments of the present disclosure.

Figure 7:
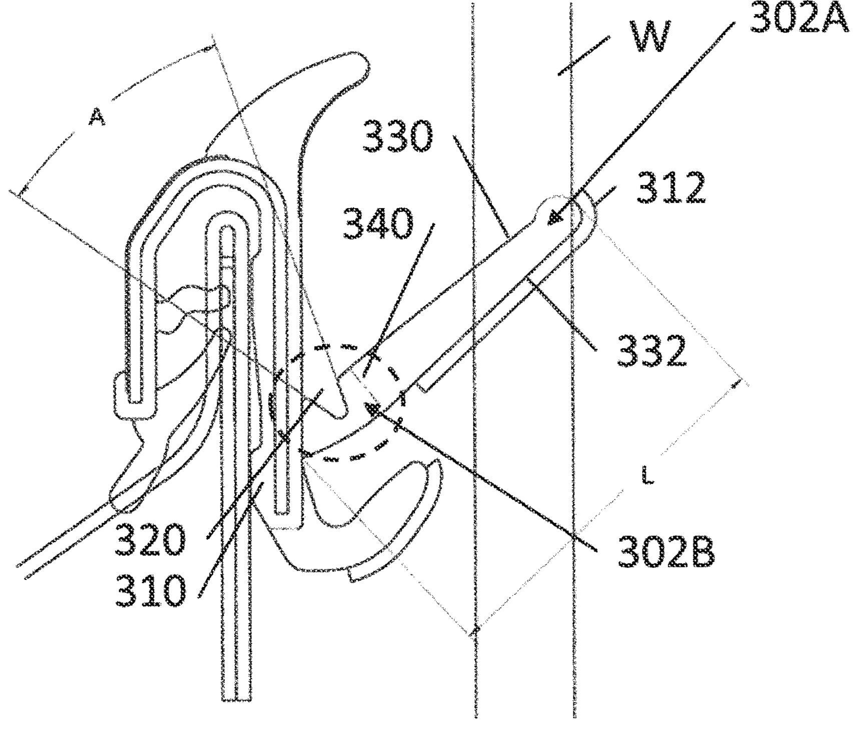
FIGS. 7 and 8 show a belt seal assembly that includes a dual durometer lip of the type shown in FIG. 3.
Figure 8:
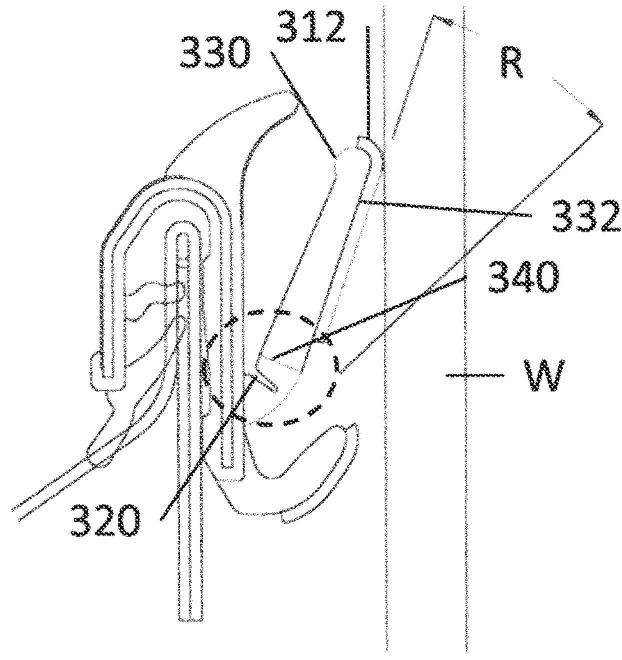
Figure 9:
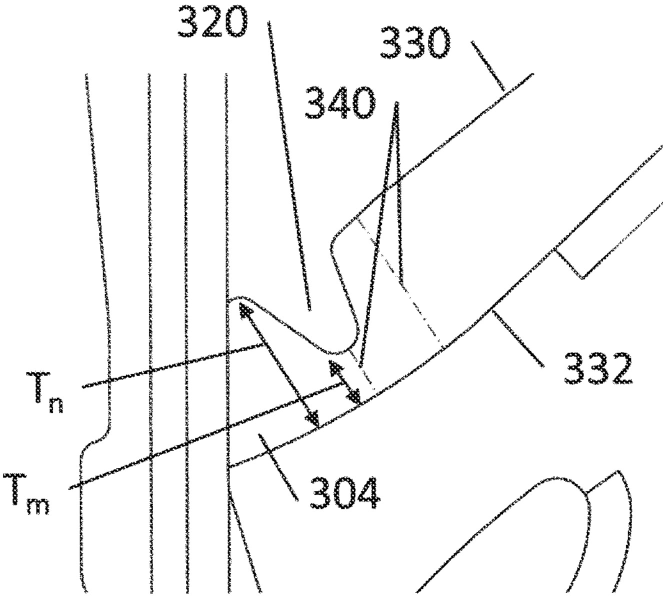
FIG. 9 is an enlarged view of the encircled region of FIG. 8.

Shown in FIG. 9, an interface or knit line 340 is formed between the harder and softer material portions of the seal lip 302, and the knit line 340 preferably extends across an entire cross-section of the seal lip, i.e., from a first face 330 to a second face 332 of the seal lip. The knit line 340 may be oriented at different positions relative to the "V" shaped hinge and may in fact be located to the bottom of the "V" shaped hinge, and may be planar as shown in FIGS. 7 and 8 or irregular or non-planar. At least one or more of the following additional features of the dual durometer seal lip shown in FIGS. 5, 7, and 8 may be advantageously used for improved performance relative to prior known arrangements. For example, a lip length (L) to nominal thickness ($T_n$) ratio in a range from 5:1 to 8:1 is preferred. An angle (A) of the V-shaped lip hinge preferably ranges from 30° to 40° (FIG. 7). A seal lip nominal thickness ($T_n$) to lip thickness minimum ($T_m$) ratio ranging from 1.9:1-3.2:1 is preferred (FIG. 9). Still another preferred geometrical relationship is that the rotational angle R of the seal lip ranges from 25° to 35° (FIG. 8). Moreover, the preferred position of the knit line 340 (FIG. 9) ranges from a position clearly to the right of the "V" shaped hinge to the very bottom of the "V" shaped hinge (FIG. 9), and is useful for tuning an initial compression load deflection. Typically, the knit line 340 position in the bottom of the "V" shaped hinge produces a larger strain value and a higher initial CLD. FIG. 7 also provides representative hardness values for the different materials used in a representative seal lip, for example the harder material of the first portion 302A has approximately an 80-92 Shore A hardness, while the second portion 302B has approximately a 55-70 Shore A hardness. The harder material described for 302A can also be an engineering polymer like polypropylene which would have a Young's modulus of approximately 1000-5000 Mpa.

Figure 10:
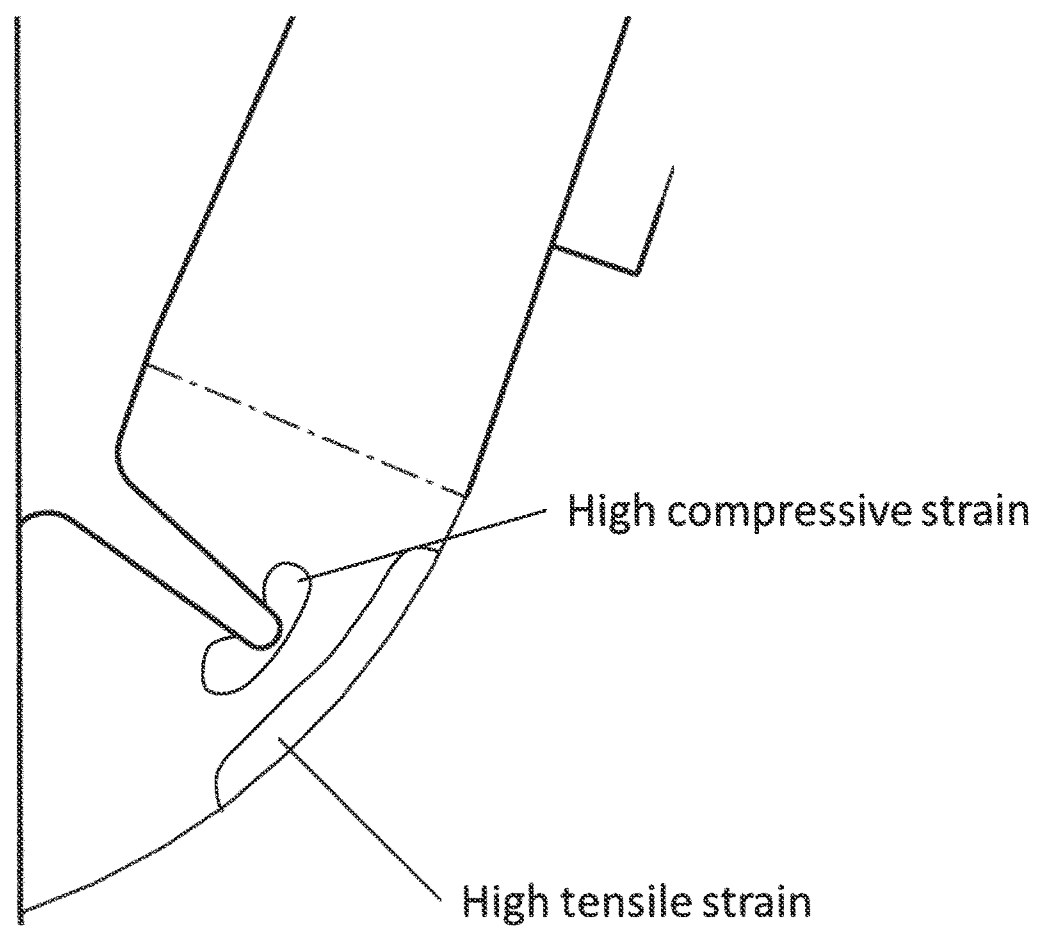
FIG. 10 illustrates tensile and compressive strain concentrated in the hinge region.

As noted previously, one goal of the present disclosure is to concentrate as much strain as possible into as small an area as possible. This is graphically illustrated in FIG. 10 where the upper left-hand portion of the seal lip is under compressive strain while the lower right-hand portion thereof is under tensile strain. Concentrated strain in the hinge from bending is shown in two distinct and separate areas corresponding to compressive and tensile.

So with the conventional embodiment of FIG. 1, strain is evenly distributed <5%. In the first preferred embodiment of the present disclosure, peak strain is concentrated in the hinge ≤15%, while in the second preferred embodiment, the multi-durometer lip hinge peak strain is about 15%.

There are two common test methods to measure LL and CS. The first test method is referred to a cooled uncompressed test method (typically the preferred test method used in North America). In this test method, the seal lip is placed in a fixture to hold the lip and locate the lip inside a test frame. The test frame deflects the lip "X" times (where "X" is typically 3 or 9 depending on the specification of the automobile manufacturer) and on the next deflection the position and load are measured when deflected into the intended operative position of the seal lip. The seal lip is then deflected and heated up to 80° C. for approximately 22 hours and then removed from the oven. In this procedure the deflection is removed and the part is allowed to cool uncompressed. The part is then placed back into the test frame and the seal lip position and deflected load are measured once again.

The second test method is referred to as a cooled compressed test method-(Typically an EU Test Method). In this second test method, the seal lip is placed in a fixture to hold the lip. The test frame deflects the lip and measures the position and the load of the seal lip when deflected into the intended operative position of the seal lip. The seal lip is then deflected and heated up to 80° C. for approximately 22 hours and removed from the oven. In this procedure the deflection is not removed and the part is allowed to cool in its compressed position. The part is then placed back into the test frame and the lip position and deflected load are measured once again.

Figure 11:
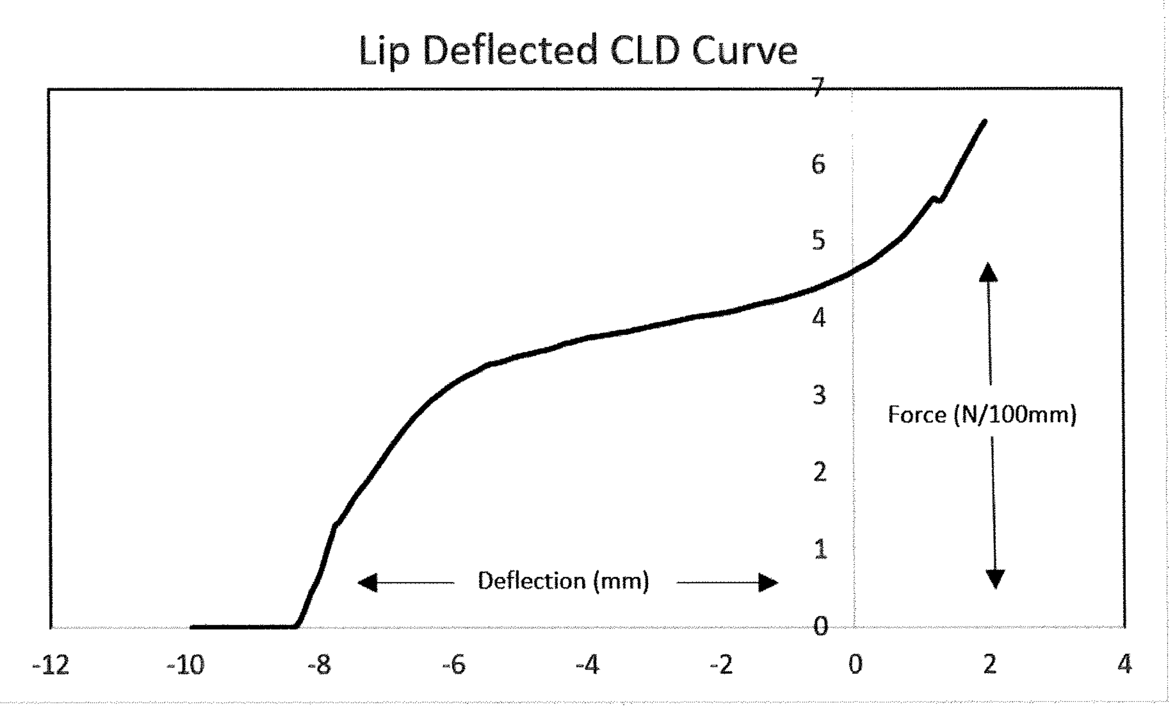
FIG. 11 graphically illustrates a position of the lip in the loading direction (in millimeters) along the x-axis and seal force (in N/100 N/mm) along the y-axis.

FIG. 11 graphically illustrates compression load deflection of the seal lip, represented by the position (in mm) of the sealing lip in the loading direction (along the x axis) while the seal force (in N/mm) (along the y axis). As is evident, the compression load deflection (CLD) is a generally flat curve over most of the deflection of the lip and the strain is concentrated into as small an area as possible.

Tables are provided in FIGS. 12A and 12B. Percentage Load Loss and Compression Set are summarized with respect to FIG. 1 and the first and second preferred embodiments described herein; namely "typical low strain" relates to FIG. 1, "high strain in hinge" relates to FIGS. 2-4, 15, and "high strain-dual duro" relates to FIGS. 5, 7-9, and 13-14.

Although both the single durometer lip design and the dual durometer lip designs can provide similar improvements to the properties of LL and CS, the dual durometer design can provide material savings of approximately 10% when directly compared to a single durometer lip design, see FIG. 12C.

Figure 13:
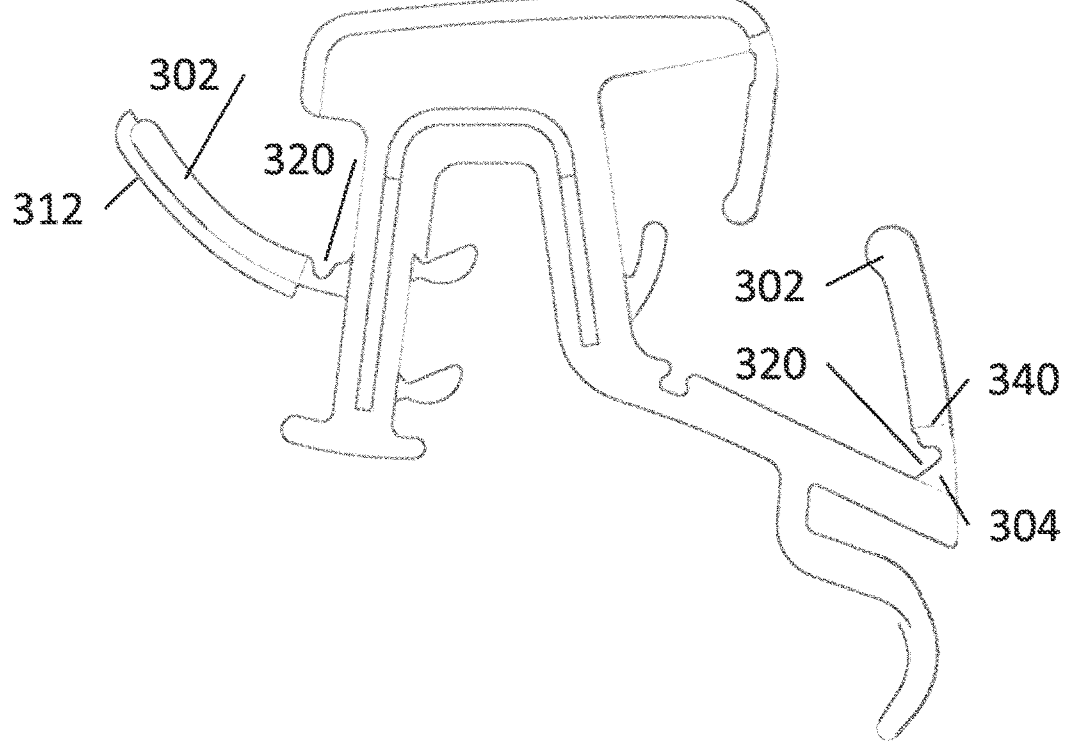
FIGS. 13 and 14 illustrate other automotive applications where this seal lip disclosure can be used.
Figure 14:
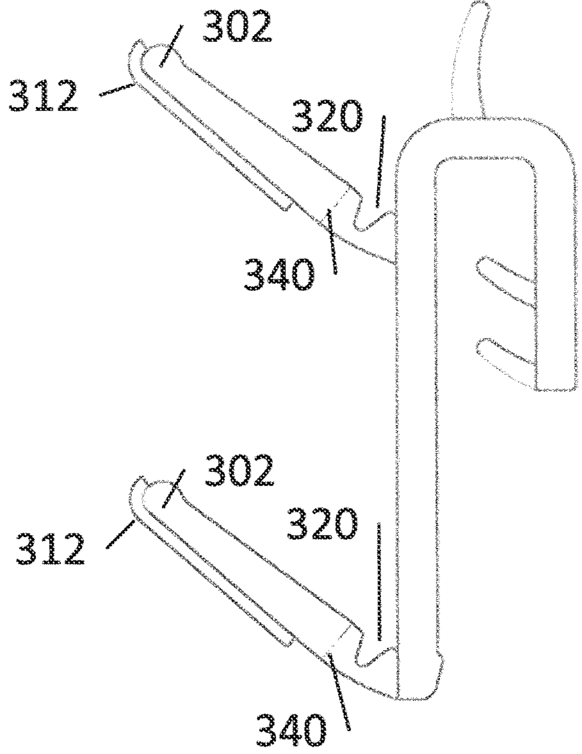

FIGS. 13-14 show other automotive applications where seal lips can take advantage of the features of the present disclosure. For example, and without limiting applications where maximizing the strain of a seal lip(s) can be used, there are shown two applications. The first application is in a header profile of a glass run channel in FIG. 13 (note the margin seal shown on the left, and the glass run channel inner seal lip shown on the right of FIG. 13). Similarly, an inner belt seal assembly or waist belt seal assembly is shown in FIG. 14. The inner belt seal assembly advantageously includes a pair of vertically spaced apart seal lips where the dual durometer seal lip embodiment of the present disclosure is employed. Here, the elongated portion of the seal lip has a higher durometer (e.g., approximately 80-92 Shore A hardness) and the mounting portion that includes the V-shaped hinge is a softer material (e.g., a lower durometer exemplified as approximately 55-70 Shore A hardness). The higher durometer material described as approximately 80-92 Shore A can also be described as an engineering polymer like polypropylene with a Young's modulus of 1000-5000 Mpa. These same values may apply to the glassrun inner glass seal lip (right-hand seal in FIG. 13 and the margin seal (left-hand seal in FIG. 13).

Still other automotive seals may employ the seal lip features described herein such as an outer belt seal, inner belt seal, glass run seal, door gap seal, margin seal, close out seal, water management seal, rocker seal, etc. Similarly, minor variations may be adopted such as the slight taper to the elongated portion 302 of the seal lips in FIG. 14.

Figure 15:
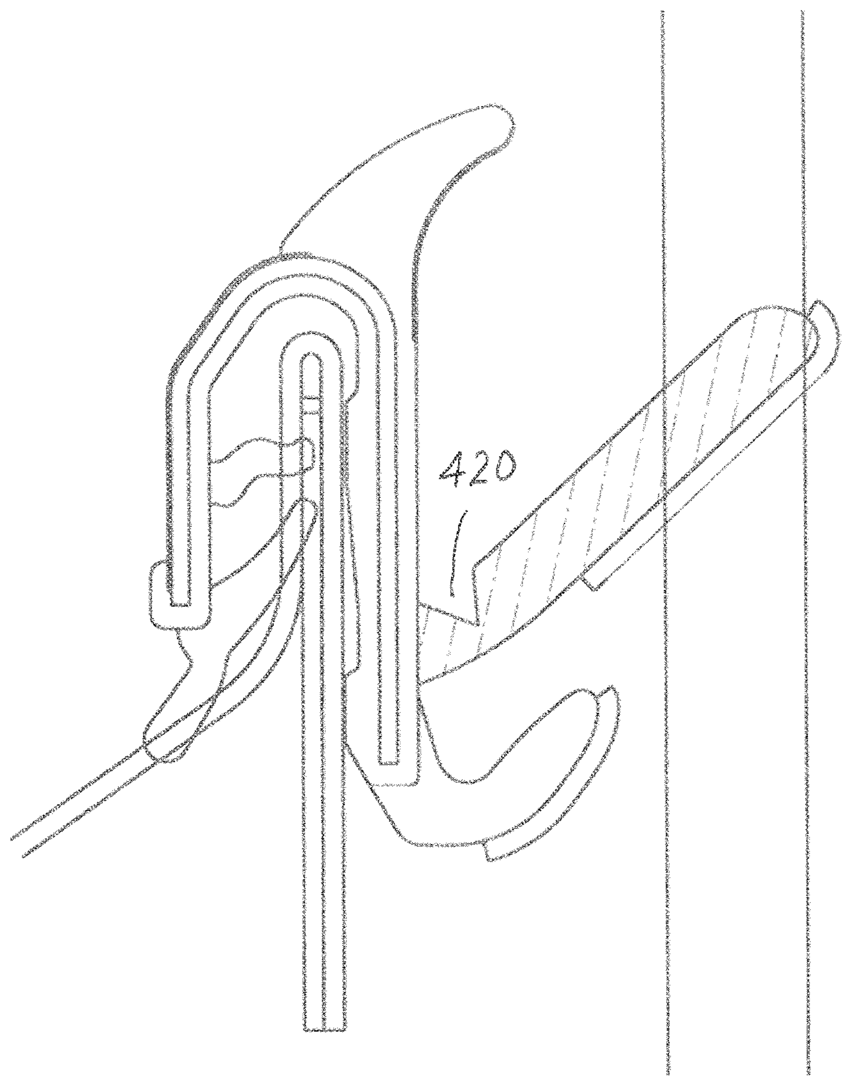
FIG. 15 shows an alternate hinge geometry in which the "V" shape is sharp at the base rather than having a radius.

The hinge geometry previously described as a "V" shape and that had a small radius, can also have a sharp pronounced angle at the bottom of the V-shaped hinge 420 as shown in FIG. 15. This sharp pronounced angle geometry can be applied to both single durometer lips shown in FIGS. 2-4, and 15 as well as the dual durometer version shown in FIGS. 5, 7-10, 13, and 14.

The elastomeric material can also be foamed by a chemical blowing agent or a mechanical blowing agent. By way of example only, the chemical blowing agent is preferably one of azodicarbonamide (AZ/ADC), sulfonyl hydrazide (OT/

OBSH), or sodium bicarbonate ($NaHCO_3$). Similarly, a mechanical blowing agent may be used such as solvent filled microspheres.

Although specific advantages have been enumerated above, various embodiments may include some, none, or all of the enumerated advantages. Although exemplary embodiments are illustrated in the figures and description herein, the principles of the present disclosure may be implemented using any number of techniques, whether currently known or not. Moreover, the operations of the systems and apparatuses disclosed herein may be performed by more, fewer, or other components, and the methods described herein may include more, fewer, or other steps. Additionally, steps may be performed in any suitable order, and the present disclosure seeks protection for a combination of components and/or steps and a combination of claims as originally presented for examination, as well as seeking potential protection for other combinations of components and/or steps and combinations of claims during prosecution.

To aid the Patent Office and any readers of this application and any resulting patent in interpreting the claims appended hereto, applicants do not intend any of the appended claims or claim elements to invoke 35 USC 112(f) unless the words "means for" or "step for" are explicitly used in the particular claim.

We claim:

1. A seal lip assembly having improved sealing force properties, the seal lip assembly comprising:

a base; and a seal lip having a proximal, first end connected to the base and a distal, second end extending outwardly from the base, and a hinge provided in the seal lip between the first and second ends to allow the second end to angularly rotate relative to the base wherein the base and seal lip are made from a single elastomeric material;

wherein the seal lip has a lip length (L) between the first and second ends and a cross-sectional nominal thickness ($T_N$), the seal lip having a ratio ($L:T_N$) of lip length to nominal thickness ranging from 5:1 to 8:1.

2. The seal lip assembly of claim 1 wherein the seal lip has a durometer ranging from approximately 55 to 80 Shore A.

3. The seal lip assembly of claim 1 wherein the seal lip has a lip thickness that is substantially constant between the hinge and the second end.

4. The seal lip assembly of claim 1 wherein the hinge is defined by a minimal thickness of the seal lip less than a nominal thickness of a remainder of the seal lip.

5. The seal lip assembly of claim 1 wherein the hinge is defined by a minimal thickness of the seal lip less than a nominal thickness of a remainder of the seal lip.

6. The seal lip assembly of claim 5 wherein a ratio ($T_n$:$T_m$) of the nominal thickness ($T_n$) to the minimal thickness ($T_m$) ranges from 1.9:1 to 3.2:1.

7. The seal lip assembly of claim 1 wherein the elastomeric material of the seal lip is one of Ethylene Propylene Diene Monomer (EPDM), Thermoplastic Vulcanizate (TPV), Thermoplastic Elastomer (TPE), Thermoplastic Rubber (TPR), Thermal Plastic Styrene (TPS), a silane-crosslinked polyolefin elastomer, or Styrene-Ethylene-Butylene-Styrene (SEBS).

8. The seal lip assembly of claim 1 wherein the seal lip is part of an automotive seal.

9. The seal lip assembly of claim 8 wherein the automotive seal is one of an outer belt seal, inner belt seal, glass run seal, door gap seal, margin seal, close out seal, water management seal, or rocker seal.

10. The seal lip assembly of claim 1 wherein the elastomeric material can be foamed by a chemical blowing agent or a mechanical blowing agent.

11. The seal lip assembly of claim 10 wherein the chemical blowing agent is one of azodicarbonamide (AZ/ADC), sulfonyl hydrazide (OT/OBSH), or sodium bicarbonate ($NaHCO_3$).

12. The seal lip assembly of claim 10 wherein the mechanical blowing agent includes solvent filled microspheres.

13. The seal lip assembly of claim 1, wherein the hinge has one of a radius at a bottom thereof or a sharp "V" without a radius.

* * * * *